N. H. MILLER.
AUTOMOBILE TIRE PROTECTOR.
APPLICATION FILED SEPT. 6, 1912.
1,091,373.
Patented Mar. 24, 1914.
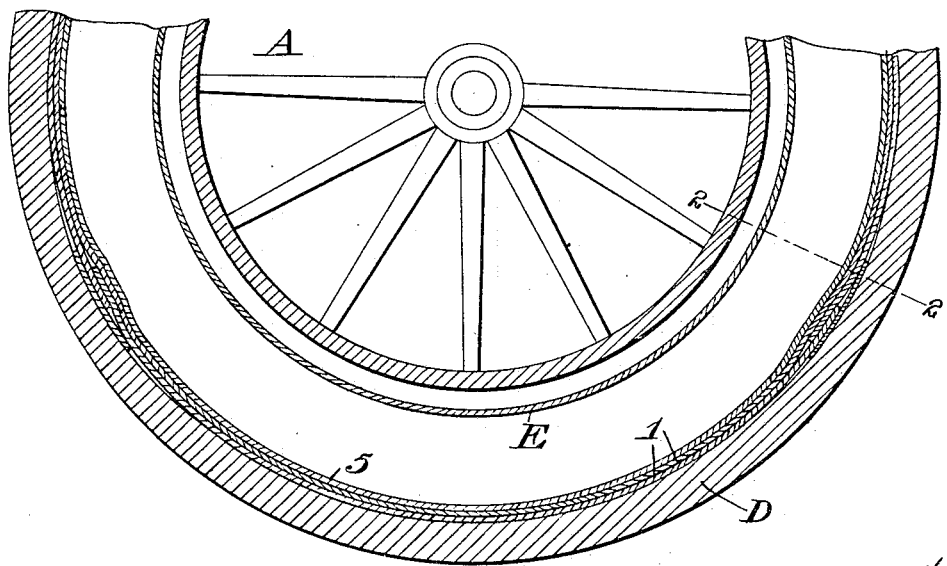
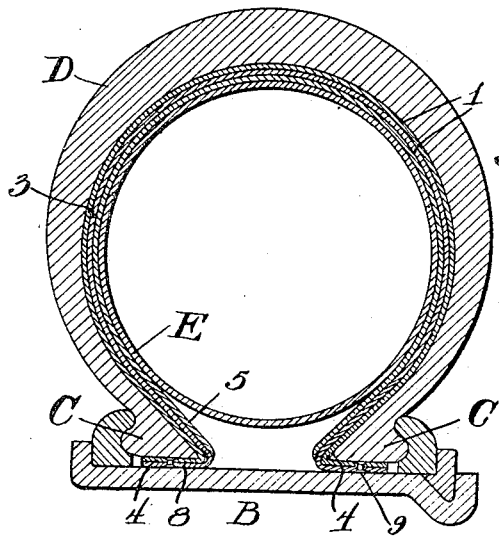
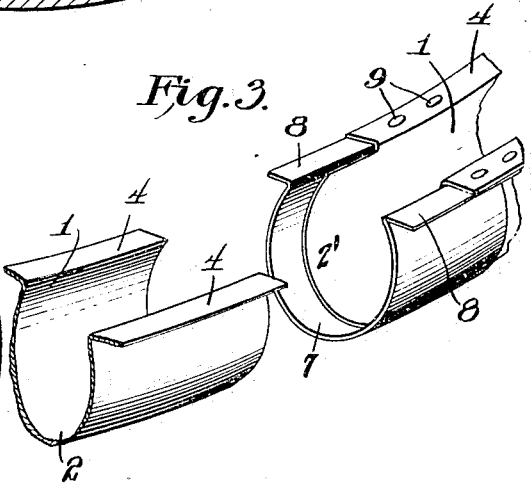
Witnesses
Wm H. Mulligan.
James A. Koehs
Inventor
Norman H. Miller.
By Victor J. Evans.
Attorney

UNITED STATES PATENT OFFICE.

NORMAN H. MILLER, OF MEADVILLE, PENNSYLVANIA.

AUTOMOBILE TIRE PROTECTOR.

1,091,373.  Specification of Letters Patent.  Patented Mar. 24, 1914.

Application filed September 6, 1912. Serial No. 718,999.

*To all whom it may concern:*

Be it known that I, NORMAN H. MILLER, a citizen of the United States, residing at Meadville, in the county of Crawford and State of Pennsylvania, have invented new and useful Improvements in Automobile Tire-Protectors, of which the following is a specification.

This invention relates to automobile tire protectors and has for an object to provide a device of this character which will accommodate itself to vehicle wheels and tires of well known construction and which will effectually serve to prevent destruction of the inner tube of the tire by objects such as nails or the like which may be collected by the outer shoe of the tire.

Another object of the invention is to provide a protecting device which when operatively associated between the outer shoe and the inner tube will not chafe or otherwise injure them.

In the drawing forming a portion of this application, and in which like letters of reference indicate similar parts in the several views:—Figure 1 is a longitudinal section through a tire and through a vehicle wheel showing the application of the protector thereto. Fig. 2 is a section on line 2—2 of Fig. 1. Fig. 3 is a perspective view of meeting ends of adjacent sections of the protector.

The vehicle wheel A herein conventionally shown is provided with the usual clencher rim B which may be made to accommodate itself to the inner portions C of the outer shoe D of the pneumatic tire, the latter being of usual construction and provided with an inner pneumatic or inflatable tube E.

The protector comprises identically constructed interfitting sections 1 which when operatively associated with each other conform with the shape of the inner walls of the shoe D. Each section is preferably constructed of thin sheet steel and is provided with an arcuate portion 2 which is disposed against the inner walls of the shoe D beneath the tread thereof. From the portion 2 the walls of said sections are curved outwardly and are extended against the inner sides of the shoe D as at 3 and at their terminals the walls are provided with circumferential hooks or flanges 4 that are adapted to engage between the rim B of the wheel and the portion C of the tire whereby when the inner tube of the tire is inflated the protector will be maintained in an operative position.

The inner walls of the sections 1 of the protector are lined with canvas or other suitable well known cushioning material 5 against which the inflated inner tube of the tire may be expanded, the said material serving as a guard to prevent the chafing of the inner tube. It is stated that the different sections 1 are adapted for interfitting engagement and in view thereof each section has one of its ends extended beyond the terminal of the flanges 4 as shown at 2' and has secured thereto as at 9 a reinforcing member 7 which is of a transverse configuration conforming with the corresponding portion of the member and has a portion extending slightly beyond one end of the member and spaced from said end whereby the latter and the extended portion of the member 7 mutually define a socket for one end of the adjacent section of the protector. This construction is such that the companion sections 1 are free for circumferential movements to allow for extension and contraction of the metal.

From the construction described it is evident that the protector, while being yieldable to accommodate itself to collapsed or extended conditions of the outer shoe and while adding in a measure to the resiliency of the tire, it also forms a puncture-proof surface between the outer shoe and the inner tube of the tire so as to prevent the said inner tube from being scarred. In other words the guard positively prevents nails, tacks or like pointed objects which may be collected by the shoe from entering past the protector and from coming into contact with the inner tube. It is also said that the members 7 serve to materially reinforce the structure immediately at the joints between the companion sections; that they form protectors to guard against the chafing or cutting of the inner tube E of the tire, and that their relative association with adjacent portions of the sections is desirable toward facilitating connecting the members together. The members 7 are provided with flanges 8 which are bolted at 9 to the flanges 4 as shown in Fig. 3.

I claim:—

A tire protector comprising a plurality of identically constructed metallic sections, each having its side walls terminating in outwardly extending flanges, each of said sections having one of its ends extended beyond one edge of the flanges, reinforcing members overlapping each of the said extended ends and having a portion thereof extending beyond said end and having its walls thereof spaced from the wall of the said end so as to define therewith sockets, so as to receive one end of the adjacent section, said walls of the reinforcing members having their longitudinal edges bent to provide flanges adapted to overlap the flanges of the sections, and to be secured thereto, the said flanges of the sections and of the members being adapted to extend between the rim of the wheel and the adjacent portion of the tire, and cushioning surfaces of the inner walls of the said sections.

In testimony whereof I affix my signature in presence of witnesses.

NORMAN H. MILLER.

Witnesses:
   JOHN D. McCOY,
   ISAAC MONDEREAU,
   JOHN W. MILLER.